US008312418B2

(12) United States Patent
Cowan et al.

(10) Patent No.: US 8,312,418 B2
(45) Date of Patent: Nov. 13, 2012

(54) VISUALIZATION OF IMPLICIT RELATIONSHIPS IN A TRACE QUERY FOR MODEL DRIVEN DEVELOPMENT

(75) Inventors: Scott D. Cowan, Ottawa (CA); Brent A. Nicolle, Nepean (CA)

(73) Assignee: International Business Machines Corporation, Armonk, NY (US)

( * ) Notice: Subject to any disclaimer, the term of this patent is extended or adjusted under 35 U.S.C. 154(b) by 1363 days.

(21) Appl. No.: 11/953,667

(22) Filed: Dec. 10, 2007

(65) Prior Publication Data

US 2009/0150861 A1 Jun. 11, 2009

(51) Int. Cl.
*G06F 9/44* (2006.01)

(52) U.S. Cl. .................. 717/104; 717/105; 717/109

(58) Field of Classification Search .................. None
See application file for complete search history.

(56) References Cited

U.S. PATENT DOCUMENTS

| | | | | |
|---|---|---|---|---|
| 7,343,386 | B2 * | 3/2008 | Gomes et al. | 717/100 |
| 7,526,753 | B2 * | 4/2009 | Spencer et al. | 717/109 |
| 7,779,384 | B2 * | 8/2010 | Lin et al. | 717/105 |
| 8,024,703 | B2 * | 9/2011 | Gerken et al. | 717/109 |
| 8,127,270 | B1 * | 2/2012 | Jerman et al. | 717/104 |
| 2006/0064667 | A1 * | 3/2006 | Freitas | 717/104 |
| 2006/0136865 | A1 * | 6/2006 | Lin et al. | 717/105 |
| 2006/0174190 | A1 * | 8/2006 | Gomes et al. | 715/511 |
| 2007/0180424 | A1 * | 8/2007 | Kazakov et al. | 717/104 |
| 2007/0226681 | A1 * | 9/2007 | Thorup | 717/104 |
| 2008/0263503 | A1 * | 10/2008 | Polly et al. | 717/100 |
| 2008/0282220 | A1 * | 11/2008 | Krueger et al. | 717/104 |
| 2009/0083697 | A1 * | 3/2009 | Zhang et al. | 717/105 |

OTHER PUBLICATIONS

Ståle Walderhaug, Towards a Generic Solution for Traceability in MDD, 2006 Workshop (ECMDA-TW), 10 pages, <http://bluecoat-01/?cfru>.*
Raffaella Settimi et al, Supporting Software Evolution through Dynamically Retrieving Traces to UML Artifacts, IEEE 2004, 6 pages, <http://ieeexplore.ieee.org/stamp/stamp.jsp?tp=&arnumber=1334768>.*
B. T. Nolan et al, Model traceability, IBM systems Journal, vol. 45, No. 3, 2006, pp. 515-526, <http://ieeexplore.ieee.org/stamp/stamp.jsp?tp=&arnumber=5386621>.*
Balasubramaniam Ramesh, Toward Reference Models for Requirements Traceability, IEEE Jan. 2001, pp. 58-93, <http://ieeexplore.ieee.org/stamp/stamp.jsp?tp=&arnumber=895989>.*
Markus Scheidgen, Model Patterns for Model Transformations in Model Driven Development, IEEE 2006, 10 pages, <http://ieeexplore.ieee.org/stamp/stamp.jsp?tp=&arnumber=1604775>.*

(Continued)

*Primary Examiner* — Thuy Dao
*Assistant Examiner* — Cuong V Luu
(74) *Attorney, Agent, or Firm* — Steven M. Greenberg, Esq.; Carey, Rodriguez, Greenberg & O'Keefe

(57) ABSTRACT

Embodiments of the present invention address deficiencies of the art in respect to traceability visualization in a model driven development (MDD) tool and provide a method, system and computer program product for visualization of implicit relationships in a trace query for MDD. In an embodiment of the invention, a method for visualization of implicit relationships in a trace query for MDD can be provided. The method can include issuing a model query in an MDD tool, retrieving an implicit relationship in response to the model query, generating a trace link for the implicit relationship and displaying the trace link in a trace query diagram for the MDD tool.

11 Claims, 1 Drawing Sheet

OTHER PUBLICATIONS

M. Born et al, Significant Productivity Enhancement through Model Driven Techniques: A Success Story, IEEE 2006, 7 pages, <http://ieeexplore.ieee.org/stamp/stamp.jsp?tp=&arnumber=4031223>.*

Model Analysis, Feb. 8, 2006, IBM Rational; http://www.ibm.com/developerworks/forums/messages.jspc?messageID-13787751.

Downloadable Files: IBM Rational Software Architect Refresh Pack 6.0.1; http://www-1.ibm.com/support/docviews.wss?rs-2044&context=scm72&dc-d400&uid, software release date: Sep. 9, 2005.

* cited by examiner

VISUALIZATION OF IMPLICIT RELATIONSHIPS IN A TRACE QUERY FOR MODEL DRIVEN DEVELOPMENT

BACKGROUND OF THE INVENTION

1. Field of the Invention

The present invention relates to the field of software architecture and modeling and more particularly to requirements traceability in a model driven development (MDD) environment.

2. Description of the Related Art

Modern software systems have become increasingly pervasive and open-ended, and are expected to deliver critical computing services in a dependable manner across multiple, heterogeneous computing environments. To better manage the complexity of developing modern software systems, software development strategies can be employed which raise the level of abstraction at which software systems are conceived, implemented and evolved. Model-driven development (MDD) represents one such software development strategy in which models are the primary artifacts of software development.

Modeling complex applications has several general benefits which can include a better understanding of the business or engineering situation at hand, the construction and design of application architectures, and the creation of visualizations of code and other forms of implementation. In this regard, the essence of modeling is abstraction and any visualization of code is indeed an abstraction in that application information can be selectively exposed while details deemed unnecessary or unwanted can be suppressed. Nevertheless, the terms "code model", "implementation model" or "platform-specific model" (PSM) are often used to qualify such abstractions from a higher-level, platform independent model (PIM) that does not have such direct relationships to program code.

In conventional MDD, visual models can be created utilizing model constructs or model types. The visual models can be created from a methodological process that often begins with application requirements and culminates with a high-level architectural design model. Developers can create a detailed design model from which skeletal code can be generated to an integrated development environment (IDE). The IDE, in turn, can be used to complete the detailed coding. Any changes to the code that affect the design model can be synchronized back into the model. Likewise, any model changes can be synchronized into the existing code.

Advanced MDD tools provide for traceability. Traceability refers to the logical linkage between a design requirement and a model element in the resultant model, and on through source code produced as an implementation of the model element. Traceability can be both data driven and visual. The latter—visual—can be of enormous benefit to the end user so that the end user can visually confirm that the requirements set forth in a functional specification indeed have been reflected in the implementation. In the former circumstance, it can be challenging for the end user to confirm a relationship between requirement and implementation.

Advanced forms of the MDD tool, like Rational Software Architect™ manufactured by IBM Corporation of Armonk, N.Y. provide for manually added trace relationships and the visualization of those manually added trace relationships in order to visually demonstrate a path from specification of a requirement to implementation of software or some such other software artifact. Manually adding trace relationships can be an unwieldy process, though, for a large implementation. In the past, the Rational Software Architect MDD tool has provided for the automated detection of implicit relationships between requirements and artifacts, though, once detected these implicit relationships have been presented within a table failing to demonstrate a clear path from specification of a requirement to implementation.

BRIEF SUMMARY OF THE INVENTION

Embodiments of the present invention address deficiencies of the art in respect to traceability visualization in an MDD tool and provide a novel and non-obvious method, system and computer program product for visualization of implicit relationships in a trace query for MDD. In an embodiment of the invention, a method for visualization of implicit relationships in a trace query for MDD can be provided. The method can include issuing a model query in an MDD tool, retrieving an implicit relationship in response to the model query, generating a trace link for the implicit relationship and displaying the trace link in a trace query diagram for the MDD tool.

In one aspect of the embodiment, generating a trace link for the implicit relationship can include identifying a participant and a collaboration for the implicit relationship and generating a trace link between the participant and the collaboration. In another aspect of the embodiment, identifying a participant and a collaboration for the implicit relationship can include identifying an analysis class and a collaboration for the implicit relationship. In yet another aspect of the embodiment, the method further can include selecting the trace link in the trace query diagram and navigating to the participant of the traceability in the model in the MDD tool.

In another embodiment of the invention, an MDD data processing system can be provided. The system can include an MDD tool configured to manage creation and modification of a model from a requirements document, a model query module coupled to the MDD tool, the model query module being configured to query the model with a context to locate an implicit relationship, and visualization logic. The logic can include program code enabled to generate a trace link for the implicit relationship produced by the model query module and to display the trace link in a trace query diagram in the MDD tool. In one aspect of the embodiment, the implicit relationship can include an implied relationship evident from the model and the requirements document between a participant and a collaboration. For example, the participant can be an analysis class.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for visualization of implicit relationships in a trace query for MDD. In accordance with an embodiment of the present invention, an implicit relationship between a requirement and an artifact in an MDD tool can be detected and the participant and the collaboration for the relationship can be identified. Thereafter, a lifeline can be created between the participant and collaboration and visually displayed in a traceability view in the MDD tool. In this way, the path from requirement to implementation in the MDD tool can be visually confirmed.

Figure 1:
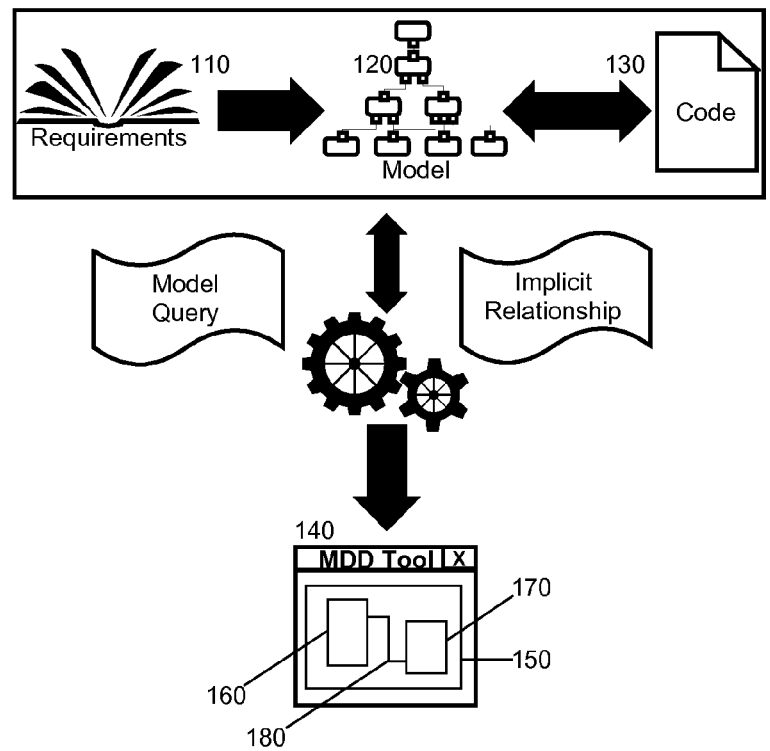
FIG. 1 is a pictorial illustration of a process for visualization of implicit relationships in a trace query for MDD.

In further illustration, FIG. 1 is a pictorial illustration of a process for visualization of implicit relationships in a trace query for MDD. As shown in FIG. 1, a software development project in an MDD tool 140 can include a requirements document 110 resulting in a model 120 from which source code 130 can be produced. Changes in the source code 130 can result in like changes in the model 120 and vice versa. A trace query process 300 can issue a model query 100A in order to identify an implicit relationship 100B between a participant and a collaboration within the requirements document 110, the model 120 or the source code 130, or any combination thereof.

In this regard, a collaboration can include a pattern of interaction among objects showing the objects participating in the interaction by their links to each other and the messages they send to each other. In contrast, the participant can be an artifact in the model 120. An example includes an analysis class representing an abstraction of one or several classes or subsystems in the model 120. In any event, a trace diagram 150 in the MDD tool 140 can display the participant 160 visually connected to the collaboration 170 with a lifeline 180 in order to visually express the implicit relationship 100B.

Figure 2:
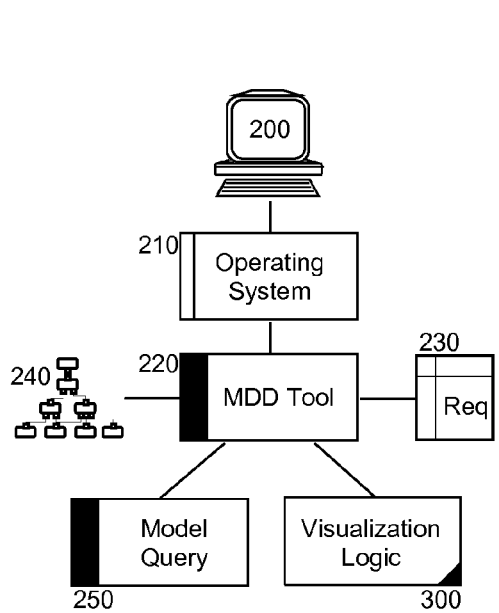
FIG. 2 is a schematic illustration of a MDD data processing system configured for visualization of implicit relationships in a trace query for MDD; and, FIG. 3 is a flow chart illustrating a process for visualization of implicit relationships in a trace query for MDD.

The process described herein can be embodied in an MDD environment. In illustration, FIG. 2 schematically depicts an MDD data processing system configured for visualization of implicit relationships in a trace query for MDD. The system can include a host computing platform 200 supporting the execution of an operating system 210. The operating system 210 in turn can host the operation of one or more applications including MDD tool 220. The MDD tool 220 can be configured to manage the architecting of a software application from requirements 230 to model 240 and thereafter to source code (not shown for the purpose of illustrative simplicity).

A model query module 250 can be coupled to the MDD tool 220. The model query module 250 can be configured to respond to query input by searching the model 240 (and other models) for artifacts and other material associated with a provided query. For example, the model query module 250 can be configured in response to a query to produce any of corresponding stereotype information, the identity model in which queried elements are found, the type of elements found in response to a query such as class or interface, and a display of a set of properties in a properties view corresponding to an element found in response to a query. The model query module 250 further can be configured to check a model for trace links, both real and implied.

Notably, visualization logic 300 further can be coupled to the MDD tool 220 and by extension to the model query module 250. The visualization logic 300 can include program code enabled to retrieve implicit relationships located by the model query module 250 and to identify both the participant and collaboration for each of the retrieved implicit relationships. Thereafter, the program code of the visualization logic 300 can be enabled to generate a visual lifeline reflecting a trace link between the participant and the collaboration for each of the retrieved implicit relationships in a trace query diagram in the MDD tool 220. Optionally, the trace link can be selected in the trace query diagram in response to which the end user can navigate to the participant of the traceability in the model in the MDD tool. In this way, an end user can visualize the path from requirements to implementation without being required to manually specify the path from the implicitly related participant and collaboration.

Figure 3:
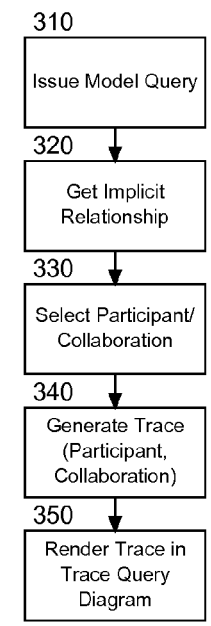

In yet further illustration of the operation of the visualization logic 300, FIG. 3 is a flow chart illustrating a process for visualization of implicit relationships in a trace query for MDD. Beginning in block 310 a model query can be issued to the MDD tool. In block 320 the model query can return an implicit relationship in the MDD tool between a participant and a collaboration. In block 330, the participant and the collaboration for the implicit relationship can be determined and a trace can be generated between the participant and the collaboration in block 340. Finally, in block 350 the trace can be visually rendered in a trace query diagram in the MDD tool so as to visualize the traceability of the implicit relationship.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A method, executable by a processor, for visualization of implicit relationships in a trace query for model driven development (MDD), the method comprising:
   issuing a model query in an MDD tool to search a model for artifacts associated with the query;
   retrieving in response to the model query an implicit relationship between a participant and a collaboration within at least one of a requirements document for the model, the model and source code produced from the model;
   generating a trace link for the implicit relationship; and,
   displaying the trace link in a trace query diagram for the MDD tool.

2. The method of claim 1, wherein generating a trace link for the implicit relationship, comprises:
   identifying a participant and a collaboration for the implicit relationship; and,
   generating a trace link between the participant and the collaboration.

3. The method of claim 2, wherein identifying a participant and a collaboration for the implicit relationship, comprises identifying an analysis class and a collaboration for the implicit relationship.

4. The method of claim 1, further comprising:
   selecting the trace link in the trace query diagram; and,
   navigating to the participant of the traceability in the model in the MDD tool.

5. A model driven development (MDD) data processing system comprising:
   a MDD tool stored in memory of a computer and configured to manage creation and modification of a model from a requirements document;
   a model query module coupled to the MDD tool, the model query module being configured to query the model tool to search a model for artifacts associated with the query and to locate in response to the query an implicit relationship between a participant and a collaboration within at least one of a requirements document for the model, the model and source code produced from the model; and,
   visualization logic comprising program code enabled to generate a trace link for the implicit relationship produced by the model query module and to display the trace link in a trace query diagram in the MDD tool.

6. The system of claim 5, wherein the implicit relationship comprises an implied relationship evident from the model and the requirements document between a participant and a collaboration.

7. The system of claim 6, wherein the participant is an analysis class.

8. A computer program product comprising a computer usable storage medium, not including signal, storing computer usable program code for visualization of implicit relationships in a trace query for model driven development (MDD), the computer program product comprising:
   computer usable program code for issuing a model query in an MDD tool to search a model for artifacts associated with the query;
   computer usable program code for retrieving in response to the query an implicit relationship between a participant and a collaboration within at least one of a requirements document for the model, the model and source code produced from the model;
   computer usable program code for generating a trace link for the implicit relationship; and,
   computer usable program code for displaying the trace link in a trace query diagram for the MDD tool.

9. The computer program product of claim 8, wherein the computer usable program code for generating a trace link for the implicit relationship, comprises:
   computer usable program code for identifying a participant and a collaboration for the implicit relationship; and,
   computer usable program code for generating a trace link between the participant and the collaboration.

10. The computer program product of claim 9, wherein the computer usable program code for identifying a participant and a collaboration for the implicit relationship, comprises computer usable program code for identifying an analysis class and a collaboration for the implicit relationship.

11. The computer program product of claim 8, further comprising:
    computer usable program code for selecting the trace link in the trace query diagram; and,
    computer usable program code for navigating to the participant of the traceability in the model in the MDD tool.

* * * * *